(12) United States Patent
Tomasovics et al.

(10) Patent No.: US 9,036,657 B2
(45) Date of Patent: May 19, 2015

(54) VARIABLE LOAD DRIVER WITH POWER MESSAGE TRANSFER

(71) Applicant: Infineon Technologies AG, Neubiberg (DE)

(72) Inventors: Attila Tomasovics, Singapore (SG); Arno Rabenstein, Singapore (SG); Jan Boril, Prague (CZ); Matthias Burkert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 174 days.

(21) Appl. No.: 13/741,374

(22) Filed: Jan. 14, 2013

(65) Prior Publication Data

US 2014/0198804 A1    Jul. 17, 2014

(51) Int. Cl.
| H03K 7/08 | (2006.01) |
| H04J 3/00 | (2006.01) |
| H04L 12/931 | (2013.01) |
| H05B 33/08 | (2006.01) |

(52) U.S. Cl.
CPC ............ H04L 49/00 (2013.01); H05B 33/0842 (2013.01)

(58) Field of Classification Search
USPC ......... 370/204, 205, 212, 213, 533, 476, 514, 370/520; 375/238, 239, 241, 242
See application file for complete search history.

(56) References Cited

U.S. PATENT DOCUMENTS

| 8,278,840 | B2 * | 10/2012 | Logiudice et al. ............ 315/294 |
| 2007/0109328 | A1 * | 5/2007 | Lewis ............................ 345/691 |
| 2007/0189521 | A1 * | 8/2007 | Ikushima et al. ............... 380/30 |
| 2011/0068689 | A1 | 3/2011 | Scenini |
| 2011/0291584 | A1 * | 12/2011 | Filippo et al. ................. 315/291 |
| 2013/0004182 | A1 * | 1/2013 | Kim et al. ...................... 398/118 |
| 2013/0076250 | A1 * | 3/2013 | Logiudice ...................... 315/161 |
| 2013/0147513 | A1 * | 6/2013 | Hlebowitsh et al. ............ 326/38 |
| 2013/0259492 | A1 * | 10/2013 | Blakey et al. ................. 398/208 |
| 2013/0285572 | A1 * | 10/2013 | Saes .............................. 315/297 |
| 2013/0287403 | A1 * | 10/2013 | Roberts ........................ 398/118 |
| 2014/0035481 | A1 * | 2/2014 | Peting et al. .................. 315/291 |
| 2014/0042927 | A1 * | 2/2014 | Tomasovics et al. ......... 315/291 |
| 2014/0198804 | A1 * | 7/2014 | Tomasovics et al. ......... 370/474 |

FOREIGN PATENT DOCUMENTS

EP    2 230 885 A1    9/2010

* cited by examiner

*Primary Examiner* — Benjamin H Elliott, IV
(74) *Attorney, Agent, or Firm* — SpryIP, LLC (57) ABSTRACT

Representative implementations of devices and techniques provide a modulation arrangement for a control signal. The control signal is received as a digital value. A modulated control signal having a varying rate of change may be generated based on the quantity of off-bits and the quantity of on-bits of the digital value.

25 Claims, 6 Drawing Sheets

FIG. 1

EXAMPLE OUTPUT PACKET

VARIABLE LOAD DRIVER WITH POWER MESSAGE TRANSFER

BACKGROUND

With the proliferation of light-emitting-diode (LED) lamps, as well as other types of lamps, there are many applications which include dimming the lamps and changing the color of the lamps. For example, it is often desirable for LED lamps in residential and commercial applications to be dimmable (i.e., have an adjustable brightness). Additionally, it may be desirable for LED lamps to have the capability to change colors when used in instrumentation, user interface displays, and other information-related applications. Further, display screens for information or entertainment applications make use of LED lamps that dim and/or change colors.

In some applications, drivers, which may be switch-mode drivers, linear drivers, or the like, are used to control the current to the lamp. In such setups, the average current, and therefore the brightness of the lamp, can be controlled based on receiving a control signal at the enable input of the driver. Often, these drivers have a limited input bandwidth, where the enable signal is not allowed to change quickly, the driver needing a minimum time to stabilize at each input level (e.g., on-time and off-time) between switching. For example, some drivers have a minimum stable time of 10 microseconds, or the like. This minimum stable time can be longer for high power LED lamp drivers.

Additionally, many control systems that feed a binary control signal to the drivers operate at much higher frequencies, often causing electro-magnetic compatibility (EMC) issues for the associated devices. On the other hand, the bit rate for a lamp control system needs to be high enough to help the human eye low-pass filter the lamp output, to avoid the appearance of lamp flickering. In other words, the bit rate needs to be higher than the flicker fusion threshold so that the light stimulus appears steady to the human eye due to persistence of vision. Further, a sufficiently high bit rate ensures that the system has an adequate overall bandwidth. In some applications, each of these requirements conflict with one another.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Representative implementations of devices and techniques provide a modulation (or encoding, etc.) arrangement for a control signal. The modulated control signal may be used with a driver to vary the intensity of a lamp, change the color of the lamp, and the like. For example, multiple control signals may be used to vary the intensity of multiple components of a lamp concurrently, thereby changing the overall color and/or brightness of the lamp. The disclosed power message transfer (PMT) modulation arrangement provides a modulated signal to the driver, that is compatible with the driver and the system, and carries the information of the input control signal.

In an implementation, an input value is received at a PMT modulator (e.g., control signal generator). A modulated control signal having a varying rate of change may be generated by the PMT modulator based on input value. The modulated control signal generated based on the input value may be output to a driver device, for example. In one implementation, the modulated control signal is comprised of packets. Each packet is comprised of a number of consecutive on-bits and a number of consecutive off-bits. In one example, the modulated control signal has a varying rate of change.

Some implementations include multiple channels for controlling several components of a system (e.g., multiple lamp components for individual colors, etc.). Multiple PMT modulators may be used with multiple control signals, where each control signal channel includes a PMT modulator. In one implementation, a PMT modulator outputs a modulated control signal with a spread spectrum output.

Various implementations and techniques for a PMT modulator arrangement are discussed in this disclosure. Techniques and devices are discussed with reference to example light-emitting-diode (LED) lamps, devices, and systems. However, this is not intended to be limiting, and is for ease of discussion and illustrative convenience. The techniques and devices discussed may be applied to any of various lamp device designs, types, and the like (e.g., liquid-crystal-display (LCD), poly-vinyl-alcohol (PVA) display, piezoelectric material display, electron-stimulated lamps, incandescent lamps, electroluminescent (EL) lamps, etc.), as well as other continuously variable control systems that utilize one or more control signals, and remain within the scope of the disclosure. Accordingly, the use of the term "brightness" within this disclosure is intended to include intensity, magnitude, etc., of such control signals as well.

Implementations are explained in more detail below using a plurality of examples. Although various implementations and examples are discussed here and below, further implementations and examples may be possible by combining the features and elements of individual implementations and examples.

Example Brightness Control Arrangement

Figure 1:
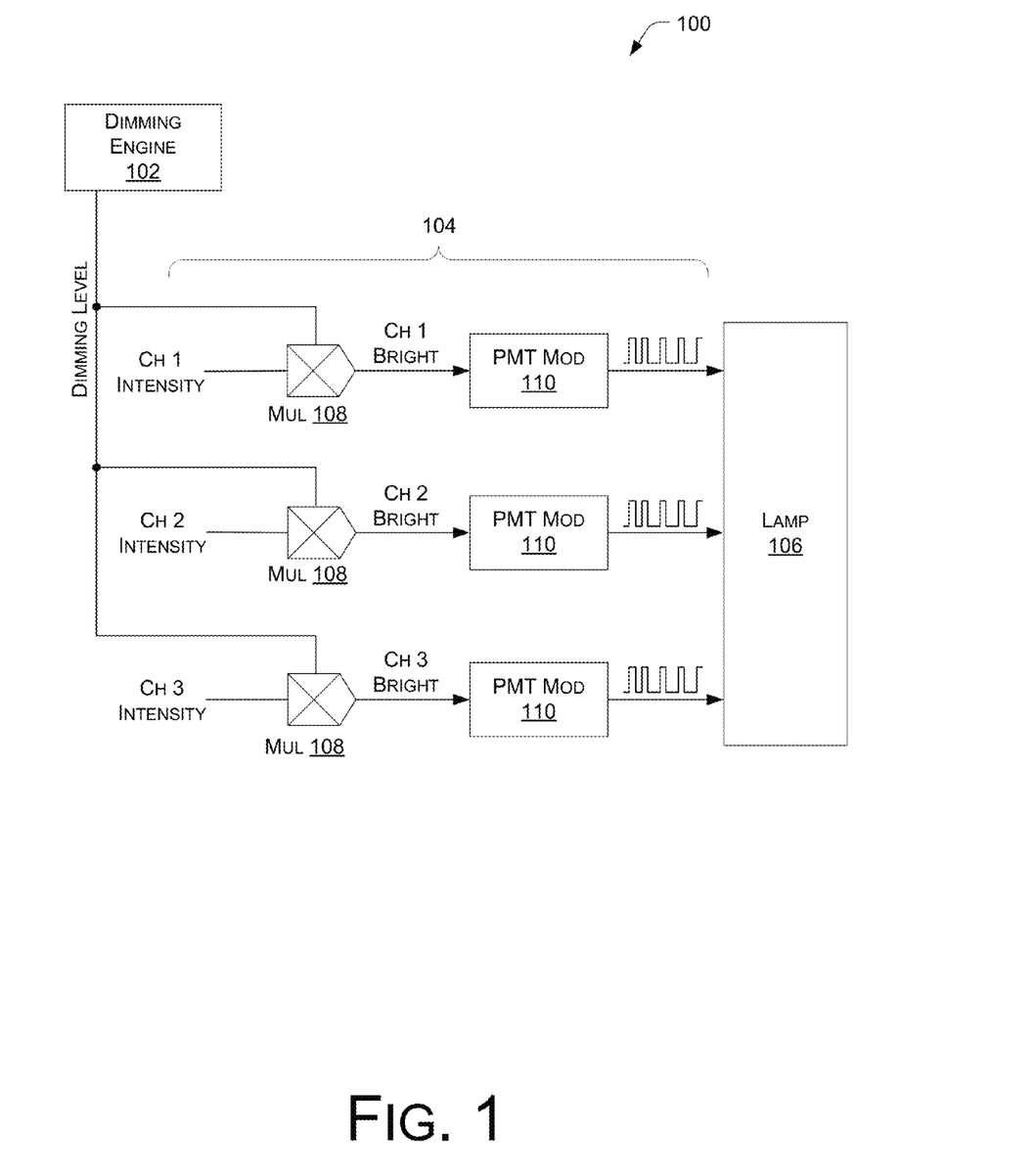
FIG. 1 is a block diagram of an example multi-channel brightness/color control arrangement for a lamp, in which the techniques described herein may be employed, according to an implementation.

FIG. 1 is a block diagram of an example multi-channel brightness/color control arrangement 100, in which the techniques described herein may be employed, according to an implementation. For example, the multi-channel brightness/color control arrangement 100 may be arranged to vary the brightness of a lamp, change the color of the lamp, and the like.

As illustrated in FIG. 1, an example multi-channel brightness/color control arrangement 100 may include one or more dimming engines 102, a quantity of channels 104, and a lamp 106, for example. In alternate implementations, fewer, additional, or alternative components may be included. For example, in various implementations, a multi-channel brightness/color control arrangement 100 may include fewer or more channels 104 than are illustrated in FIG. 1.

If included, a dimming engine 102 receives a dimming level value from a user for example, and distributes the dimming level value to each of the channels 104. In alternate implementations, the dimming level may be received from another source, such as from an output of a process, or the like. In some implementations, the dimming level is a binary value, an integer, or other similar value. The dimming level value determines the overall brightness of the lamp.

In an implementation, the relative dimming values of each channel 104 may also determine the color of the lamp 106. For example, each of the channels 104 may represent a color (i.e., red, green, and blue for a three-color/channel lamp). A combination of a greater intensity on one or more of the channels 104 and a lesser intensity on remaining channels 104 results in a particular overall brightness and/or color of the lamp. Subsequently changing the intensity value of one or more of the channels 104 changes the color or overall brightness of the lamp.

If included, each of the channels 104 may include a multiplier 108 and a modulator 110. The multiplier 108 is arranged to receive the dimming level value from the dimming engine 102 and an intensity value (e.g., ch 1 intensity, ch 2 intensity, ch 3 intensity) for each channel 104, and combine them (e.g., multiply the dimming and intensity values) to form a brightness value (e.g., ch 1 bright, ch 2 bright, ch 3 bright). In an implementation, the intensity value is a binary value, an integer, or the like. For example, in one implementation, the multiplier 108 multiplies the dimming level value by the intensity value, where both are binary values, and retains a quantity of the most significant bits of the product as the output. In one implementation, the intensity value is user-selected.

In an implementation, the modulator 110 is arranged to receive the dimming level value (a.k.a. brightness value, e.g., ch 1 bright, ch 2 bright, ch 3 bright, ch 4 bright) from the multiplier 108. In an implementation, the modulator 110 converts the brightness value to a variable frequency bit stream. The bit streams from the channels 104 are the input signals to the lamp 106. In an implementation, the mean value of a bit stream corresponds to the brightness value at the input of the respective modulator 110. For the purposes of this disclosure, a bit stream may be described as a digital approximation of an analog input. For example, a bit stream may include a digital representation that is proportional to the magnitude of the voltage or current of the analog input, over a selected duration. The digital representation may be expressed in various ways (e.g., base 2 binary code, binary coded decimal, voltage values, electrical or light pulse attributes, and the like).

In one implementation, the modulator 110 is a power message transfer (PMT) modulator, as is discussed further below. Since the human eye has a limited bandwidth, it low-pass filters the varying brightness level output by the PMT modulator 110. If the bit rate is sufficiently high, the eye senses the mean brightness of the lamp 106 that is dependent on the signal output from the PMT modulator 110. In alternate implementations, additional and/or alternate techniques and/or devices may be used with a PMT modulator 110 to convert the brightness value output at the dimming engine 102 to an input signal for the lamp 106. Further, in alternate implementations, the channels 104 may include alternate or additional components to control the brightness and/or color of the lamp 106.

In various implementations, the modulator 110 may be bypassed when a brightness value is output from the dimming engine 102 that represents nearly 0% or nearly 100% of the lamp 106 capacity or control signal level. In that case, a corresponding brightness value signal may be fed to the lamp 106 directly. For example, if the desire is for the lamp 106 to be off (e.g., a control signal value near 0%), there may be no need for a modulated signal to be sent to the lamp 106. Rather, an off signal (or the lack of any brightness signal) may be sufficient to turn the lamp off. Conversely, if the desire is for the lamp to be at or near 100%, there may be no need for a modulated signal to be sent to the lamp 106 then either. Rather, a signal representing full capacity may be sent directly to the lamp 106, bypassing the modulator 110.

In alternate implementations, various dimming and/or brightness levels may be assigned to be treated as nearly 0% (e.g., 0-3%) and nearly 100% (e.g., 97-100%) for the purposes of bypassing the modulator 110. In other implementations, other values and/or ranges may be used, corresponding to the application.

As discussed above, the lamp 106 may be an LED lamp, another type of lamp, or another controlled system that uses variable control signals. In one implementation, changes to the brightness level value at one or more of the channels 104 changes the brightness and/or color of the lamp 106.

If included, the lamp 106 may use one or more drivers (not shown) to control one or more lamps 106 or strings of lamps 106, for example. A driver may be arranged to receive a control signal from a modulator 110, and to control the current to the lamp 106, based on the control signal. In various implementations, each channel 104 of a multi-channel brightness/color control arrangement 100 may include a driver.

In alternate implementations, a multi-channel brightness/color control arrangement 100 may include fewer, additional, or alternate components.

Example PMT Modulator

Figure 2:
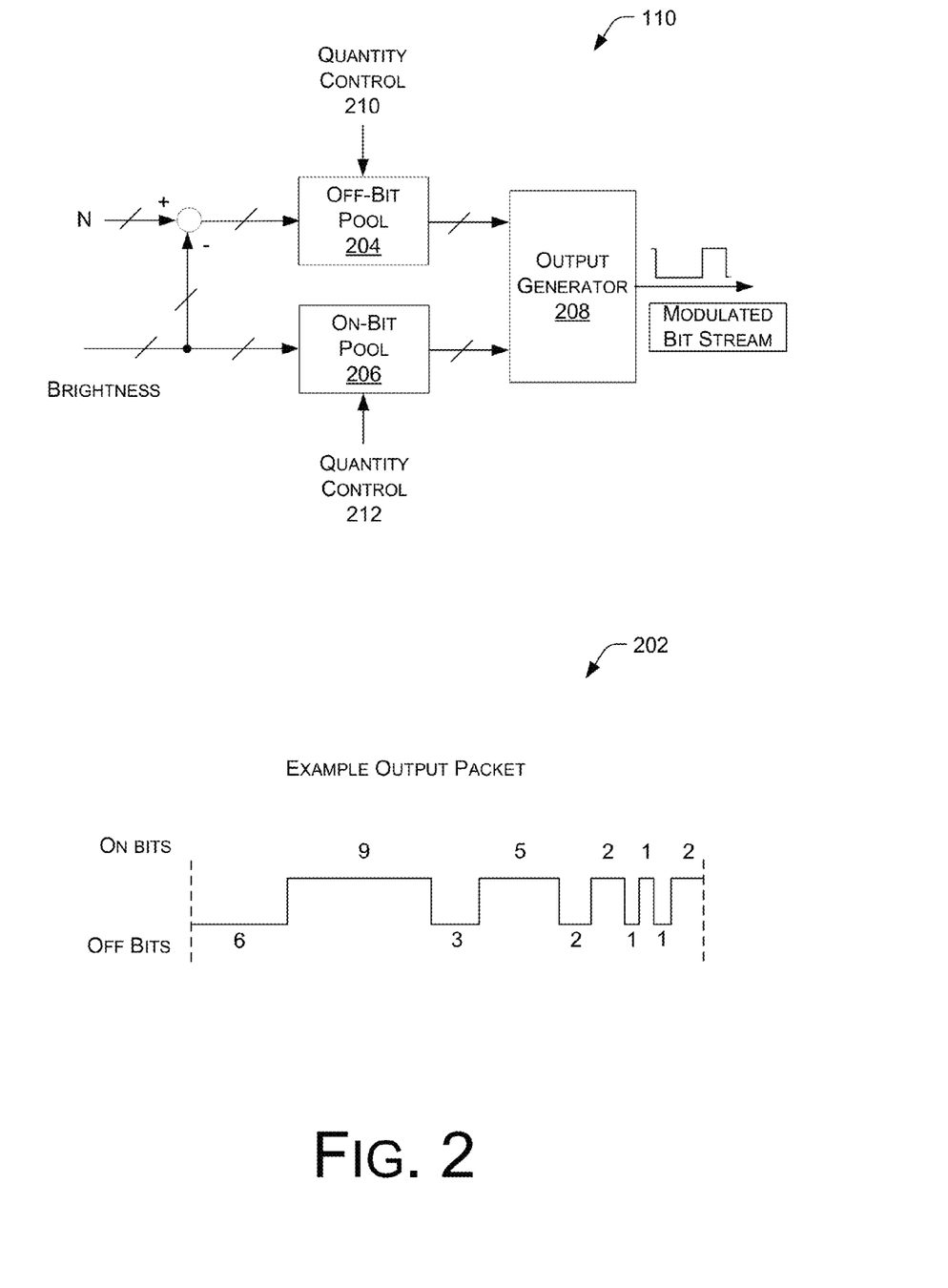
FIG. 2 is a block diagram of an example power message transfer (PMT) modulation arrangement, including an example output packet, according to an implementation.

FIG. 2 is a block diagram of an example power message transfer (PMT) modulator 110 (e.g., control signal generator), including an example output packet 202, according to an implementation. The PMT modulator 110 illustrated in FIG. 2 is shown as a single channel 104 arrangement. In various implementations, multiple PMT modulators 110 may be used to provide modulated control signals for multiple channels 104 of a multi-channel brightness/color control arrangement 100, as shown in FIG. 1 for example. In an implementation, as illustrated in FIG. 2, a PMT modulator 110 may include one or more hardware devices, including one or more bit pools (204, 206), and a packet generator (a.k.a. output generator) 208. In alternate implementations, the PMT modulator 110 may include fewer, additional, or alternate components and remain within the scope of the disclosure. Further, one or more of the components of a PMT modulator 110 may be integrated into a single device or multiple devices.

In one implementation, the PMT modulator 110 receives an input intensity value (e.g., brightness) from the multiplier 108 (if present), and generates a modulated control signal based on the input value. In various implementations, the input intensity value is a digital value having "N" bits of resolution. In the implementation, the modulated control signal has a constantly varying rate of change and a controlled average rate of change. In an implementation, the modulated control signal is a random or pseudo-random PMD bit stream. In an implementation, the PMT modulator 110 is arranged to control a rate of change of the color and/or the brightness of a lamp 106, the intensity of a variable load, and/or the like, based on the modulated control signal. For example, the mean value of the control signal may correspond to an intensity of the lamp or variable load.

In an implementation, as shown in FIG. 2, the PMT modulator 110 includes at least one off-bit pool 204 and at least one on-bit pool 206 arranged to receive the input digital value. In the implementation, the off-bit pool 204 and the on-bit pool 206 are arranged to convert the input digital value into a first quantity of off-bits and a second quantity of on-bits. For example, the quantity of off-bits and the quantity of on-bits received into the off-bit pool and the on-bit pool is based on the input digital value representing brightness or intensity. In one example, the quantity of on-bits received into the on-bit pool is proportional to the intensity level and the quantity of off-bits received into the off-bit pool is inversely proportional to the intensity level. For example, when the brightness or intensity is 75%, the off-bit pool may include 1000 off-bits and the on-bit pool may include 3000 on-bits. Further, when the brightness or intensity is 50%, the off-bit pool may include 2000 off-bits and the on-bit pool may include 2000 on-bits.

In various implementations, the PMT modulator 110 may organize the bits in the off-bit pool and/or the on-bit pool to form a packet 202 representing the relative brightness or intensity level. In an implementation, the PMT modulator 110 generates a packet 202 with off-bits grouped together in subsets and on-bits grouped together in subsets. This grouping arrangement allows the input information to be passed to the driver in a compatible manner (e.g., at an average rate of change that allows the driver to stabilize between switching events).

In one implementation, as shown in FIG. 2, the PMT modulator 110 may include an output generator 208 arranged to generate a packet 202 having alternating sets of consecutive off-bits and consecutive on-bits. In an implementation, the packet 202 is formed based on an algorithm used to select the arrangement of the off-bits and on-bits of the packet 202. For example, using one algorithm, the packet is formed by iteratively selecting a subset of off-bits from the first quantity of off-bits and a subset of on-bits from the second quantity of on-bits and appending the subset of off-bits and the subset of on-bits to the packet 202.

In the example, the algorithm includes selecting a subset (a group or quantity, etc.) of off-bits from the first quantity of off-bits 204, based on a quantity control 210, and appending the subset of off-bits to the packet 202. If the packet 202 does not yet contain any bits, the first selected subset may begin the packet 202. The algorithm then includes selecting a subset of on-bits from the second quantity of on-bits 206, based on a quantity control 212, and appending the subset of on-bits to the packet 202. The algorithm then includes selecting another subset of off-bits from the remaining off-bits of the first quantity of off-bits 204, based on the quantity control 210, and appending that subset of off-bits to the packet 202. The algorithm then includes selecting another subset of on-bits from the remaining on-bits of the second quantity of on-bits 206, based on the quantity control 212, and appending that subset of on-bits to the packet 202, and so forth.

In the implementation, as the subsets of off-bits and on-bits are selected from the respective quantities (i.e., pools) 204, 206 of bits, the pools diminish in quantity. Thus, the iterations may continue until at least one of the pools 204, 206 is depleted, for example. In one implementation, the iterations continue until at least one of the first quantity of off-bits 204 and the second quantity of on-bits 206 is less than a preselected minimum threshold quantity of bits. In various implementations, the preselected minimum threshold quantity may have various values, depending on the desired performance of the PMT modulator 110, the capabilities of the driver or lamp, or the like. For example, in various implementations, the preselected minimum threshold quantity of bits may be 0, 2, 3, 5, 10, or the like, quantity of bits.

In an implementation, the packet generator 208 is arranged to append any remaining off-bits and remaining on-bits from the first quantity of off-bits 204 and the second quantity of on-bits 206 respectively to the packet 202 when at least one of the first quantity of off-bits 204 and the second quantity of on-bits 206 has less than the preselected minimum threshold quantity of bits. Thus, any remaining bits of the pools 204, 206 are appended to the packet 202, completing the packet 202 and depleting the pools 204, 206. In alternate implementations, the packet generator 208 is arranged to append the remaining bits of the pools 204, 206 to the end of the packet 202, the front of the packet 202, a combination, or various other places within the packet 202.

Accordingly, in an implementation, the modulated control signal comprises one or more packets (i.e, frames, etc.) 202, as shown in FIG. 2. The packets 202 are representative of the information in the input brightness value. For example, each packet 202 includes alternating sets of consecutive off-bits and consecutive on-bits, representing the off-bits and on-bits of the input brightness value. The example packet 202 illustrated in FIG. 2 represents a PMT encoded frame having 5-bit resolution (32 bits), and a brightness value of 19 (e.g., 13 off-bits and 19 on-bits). Alternating subsets of consecutive off-bits and consecutive on-bits make up the packet 202, where the subsets are of varying bit length.

In alternate implementations, various bit resolutions and corresponding packet 202 lengths may be used, as desired for the application. For example, in a higher resolution example, a packet length of 4096 bits, or 12-bit resolution may be used. In various implementations, subsets of on-bits may be arranged to follow subsets of off-bits in a packet 202, as shown in FIG. 2, or the on-bits may be arranged to lead the off-bits in a packet 202. In other implementations, other bits may be included with the packet (e.g., for signaling, etc.).

In an implementation, the rate of change of the modulated control signal (e.g., encoded bit stream) output by the PMT modulator 110 is constantly varied and random. This is due to the varying lengths of consecutive subsets that make up the packets 202. Accordingly, the modulated control signal has no regular duty cycle or frequency.

In one implementation, the varying rate of change of the modulated control signal provides a spread spectrum output from the PMT modulator 110. The spread spectrum output can be viewed as a frequency band. In an implementation, the spread spectrum output lessens, if not eliminates, electromagnetic compatibility issues among the components of the system.

Further, the PMT modulator 110 provides a flexible user-controllable switching rate, based on the algorithm used, including the quantity control signals 210, 212 used. In various implementations, the packet generator 208 is arranged to output the packet 202 via an output stream having a variable rate of change. In the implementation, the mean value of the packet 202 is equal or approximately equal to the input brightness value.

In various implementations, the quantity control signals 210, 212 provide adjustable parameters to the algorithm used by the PMT modulator to select the subsets of off-bits and on-bits for the packets 202. The quantity control signals 210, 212 and associated parameters may be programmed, user input, calculated, looked up in tables, and the like. In various implementations, the quantity control signals 210, 212 and/or one or more parameters of the quantity control signals 210, 212 may be adjustable, and may be based on a current quantity of off-bits in the first pool of off-bits 204 and/or a quantity of on-bits in the second pool of on-bits 206. For example, as the quantity of bits in a pool changes, the quantity control signals 210, 212 and/or one or more parameters of the quantity control signals 210, 212 may be adjusted based on the change.

Further, as the input brightness level changes, changing the input brightness value, the quantity control signals 210, 212 and/or one or more parameters of the quantity control signals 210, 212 may be dynamically adjusted based on the change. For example, the quantity control signals 210, 212 and/or one or more parameters of the quantity control signals 210, 212 may be adjusted to avoid the packet 202 from being formed with too high of a rate of change, or the like. Parameters of the quantity control signals 210, 212 may include multipliers, divisors, minimum or maximum threshold values, and the like. In one implementation, the quantity control signals 210 and 212 are one and the same quantity control signal.

Example Algorithms

Figure 3:
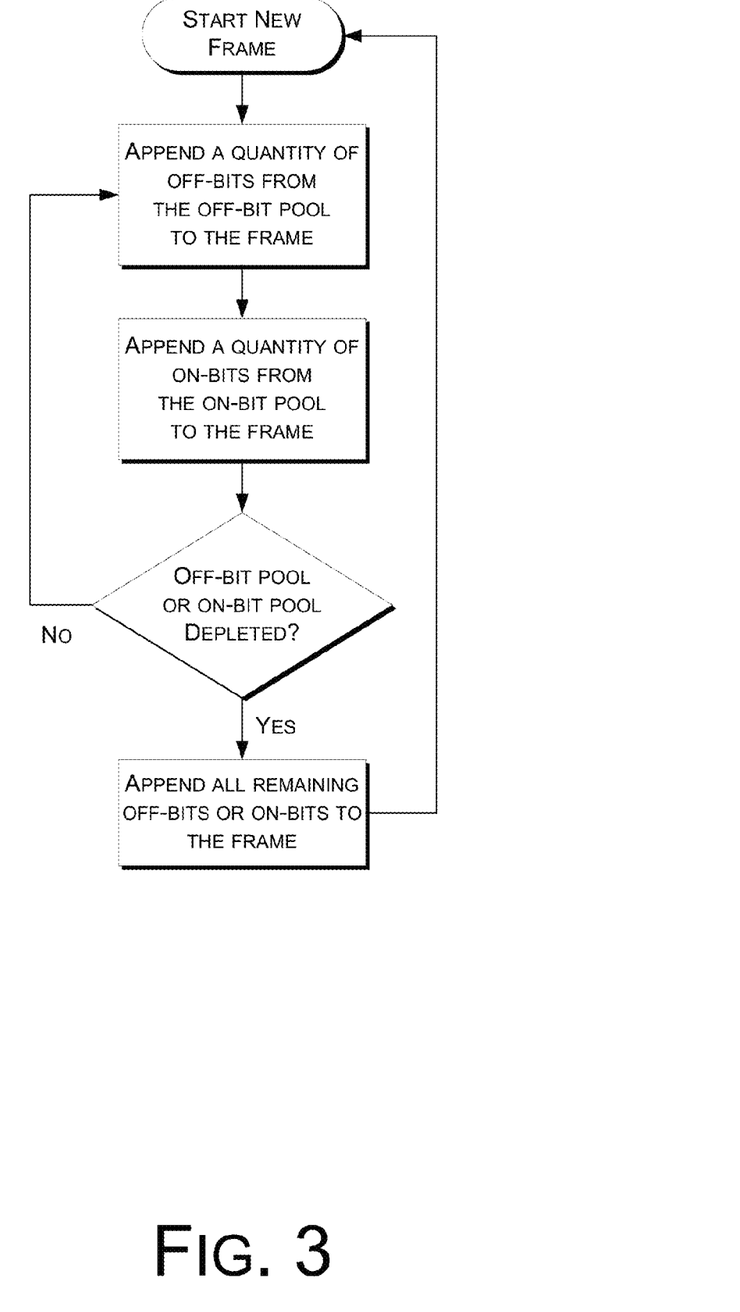
FIG. 3 is a flow diagram of an example algorithm used by a PMT modulation arrangement to generate a packet, according to an implementation.

In various implementations, differing algorithms or algorithms with differing quantity controls 210, 212 may be used for desired results. FIG. 3 is a flow diagram of one example algorithm used by a PMT modulation arrangement 110 to generate a packet 202, according to an implementation.

In the example implementation of FIG. 3, a new frame is started, based on a received input value. A quantity (e.g., subset) of off-bits from the off-bit pool 204 is appended to the frame (e.g., packet 202). A quantity (e.g., subset) of on-bits from the on-bit pool 206 is appended to the frame (e.g., packet 202). If neither of the off-bit pool 204 or the on-bit pool 206 are depleted, the algorithm continues to append subsets of off-bits and on-bits from the respective pools 204, 206 to the frame. However, if one of the off-bit pool 204 or the on-bit pool 206 are depleted, then the remaining off-bits or on-bits in the pool(s) 204, 206 are appended to the frame, completing the frame. The frame is output in a bit stream, for example, and a new frame is started based on the present input value.

In one implementation of an algorithm, the packet generator 208 is arranged to select the first subset of off-bits and the second subset of on-bits such that at least one of the first subset and the second subset has a random quantity of bits. For example, one or both of the quantity controls 210, 212 are arranged to produce a random number as the quantity of bits from the pool(s) 204, 206 to append to the frame. This may continue for all iterations, or until at least one of the pools 204, 206 is depleted, for example.

In another implementation, the packet generator 208 is arranged to select the first subset of off-bits and the second subset of on-bits such that at least one of the first subset and the second subset has a quantity of bits less than or equal to a predetermined maximum threshold quantity. For example, to avoid having too many consecutive off-bits or too many consecutive on-bits in the packet 202, a predetermined maximum threshold quantity may be established as a parameter of the quantity controls 210, 212.

In an additional implementation, the iterative selection of subsets of off-bits from the first pool of off-bits 204 and subsets of on-bits from the second pool of on-bits 206 is performed until at least one of the first pool of off-bits 204 and the second pool of on-bits 206 contains less than a preselected minimum threshold quantity of bits. In other words, the preselected minimum threshold quantity may be equal to zero, when the pool(s) 204, 206 are depleted, or it may be another value (e.g., 2, 3, 5, 10, etc.) as described above.

In a further implementation, the iterative selection of subsets of off-bits from the first pool of off-bits 204 and subsets of on-bits from the second pool of on-bits 206 is performed by dividing the first quantity of off-bits 204 and/or the second quantity of on-bits 206 by a divisor and selecting a subset of bits having a quantity of bits based on a quotient of the dividing. In alternate implementations, the divisor may be a parameter of the quantity controls 210, 212, and may include any desirable value. For example, in one implementation, the packet generator 208 is arranged to select the first subset of off-bits such that the first subset has a quantity of bits approximately equal to half of the first quantity of off-bits 204 and to select the second subset of on-bits such that the second subset has a quantity of bits approximately equal to half of the second quantity of on-bits 206. In one example, the quantity of bits in the pools 204, 206 are divided substantially in half, and the smaller (or larger, for another example) half of the bits is appended to the packet 202.

This example algorithm may be illustrated with the example packet 202 of FIG. 2. The off-bits (13) are divided in half with each iteration of selected subsets, and the smaller half appended to the packet, until the off-bit pool 204 is depleted. The on-bits (19) are also divided in half with each iteration of selected subsets, and the smaller half appended to the packet. When the off-bit pool 204 is depleted, for example, the remaining on-bits (2) of the on-bit pool 206 are appended to the packet 202.

In various alternate implementations, other divisors may be used (e.g., 3, 4, etc.), and other algorithms, parameters, quantity controls 210, 212, and the like, are within the scope of the disclosure.

In various implementations, the PMT modulator 110, including some or all of its components, may be implemented in hardware devices such as one or more digital logic components (e.g., counters, inverters, flip-flops, state machines, etc.), memory storage components, FPGAs, and the like. For example, a memory device, a field programmable gate array (FPGA), or other hardware device, may contain logic, executable instructions, or the like, arranged to execute techniques described herein.

As discussed above, the techniques, components, and devices described herein with respect to the PMT modulator 110 are not limited to the illustrations in FIGS. 1 through 5, and may be applied to other devices and designs without departing from the scope of the disclosure. In some cases, additional or alternative components may be used to implement the techniques described herein. Further, the components may be arranged and/or combined in various combinations, while resulting in the modulated control signal output. It is to be understood that a PMT modulator 110 may be implemented as a stand-alone device or as part of another system (e.g., integrated with other components, systems, etc.).

Example Implementations

Figure 4:
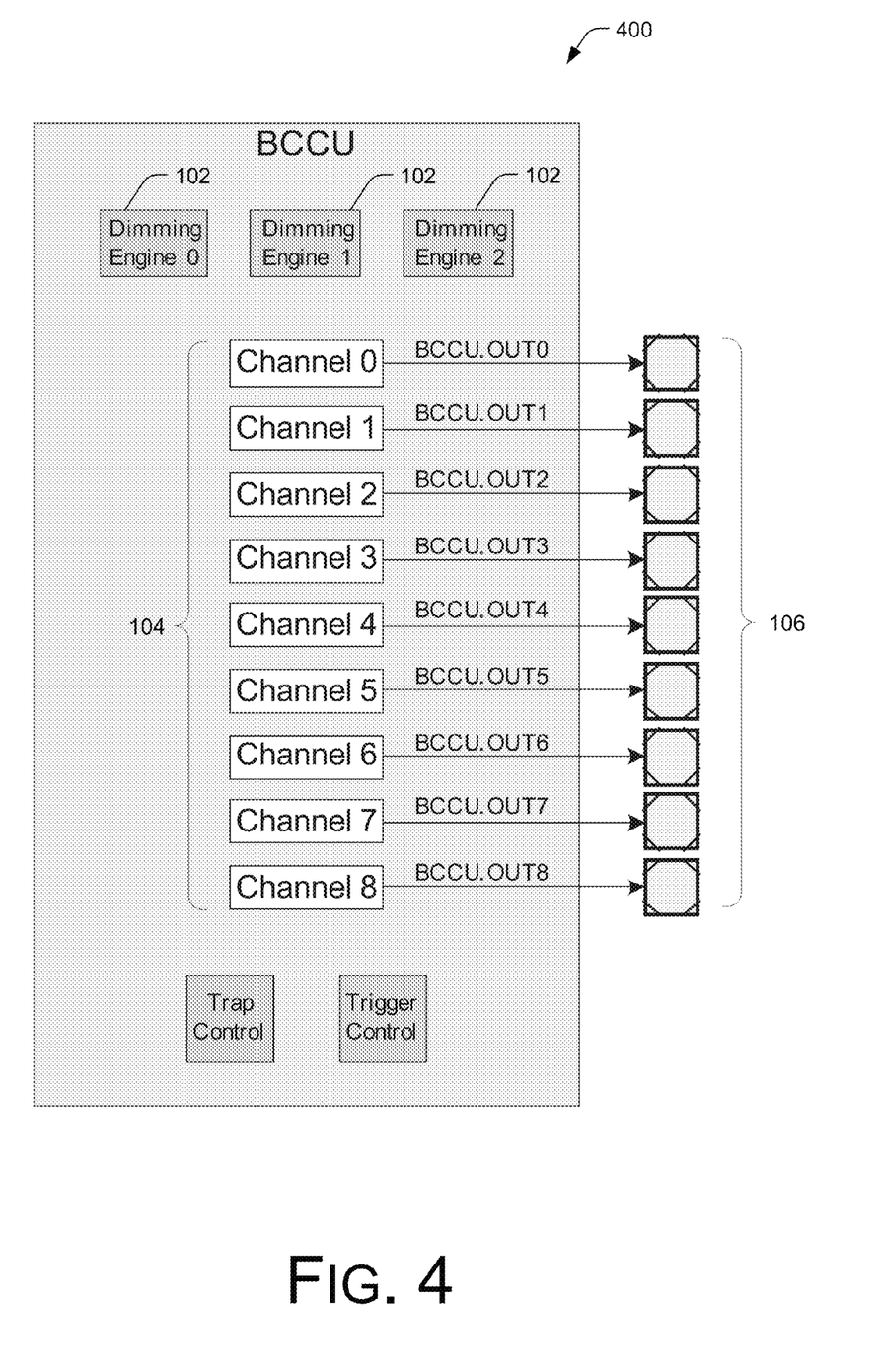
FIG. 4 is a block diagram of an example integrated brightness and color control unit (BCCU), which may incorporate a PMT modulator on one or more channels, according to an implementation.

As discussed previously, multiple PMT modulator 110 arrangements may be used to provide modulated control signals to multiple channels 104 of a lamp 106 (or other control system having multiple control signals). FIG. 4 shows a block diagram of an example brightness and color control unit (BCCU) 400, which may incorporate multiple PMT modulators 110, according to an implementation. In various implementations, the components of a PMT modulator 110 may be distributed. In the example shown in FIG. 4, the BCCU 400 includes at least 9 channels 104. In an example, each of the 9 channels 104 may include a PMT modulator 110 (as shown in FIG. 4) as part of a multi-channel brightness/color control arrangement 100. Additionally, some or each of the 9 channels 104 may be used to control the color and/or brightness of a lamp 106 or another type of control system using multiple control signals. In alternate implementations, a BCCU 400 may include fewer or additional channels 104, or components.

Figure 5:
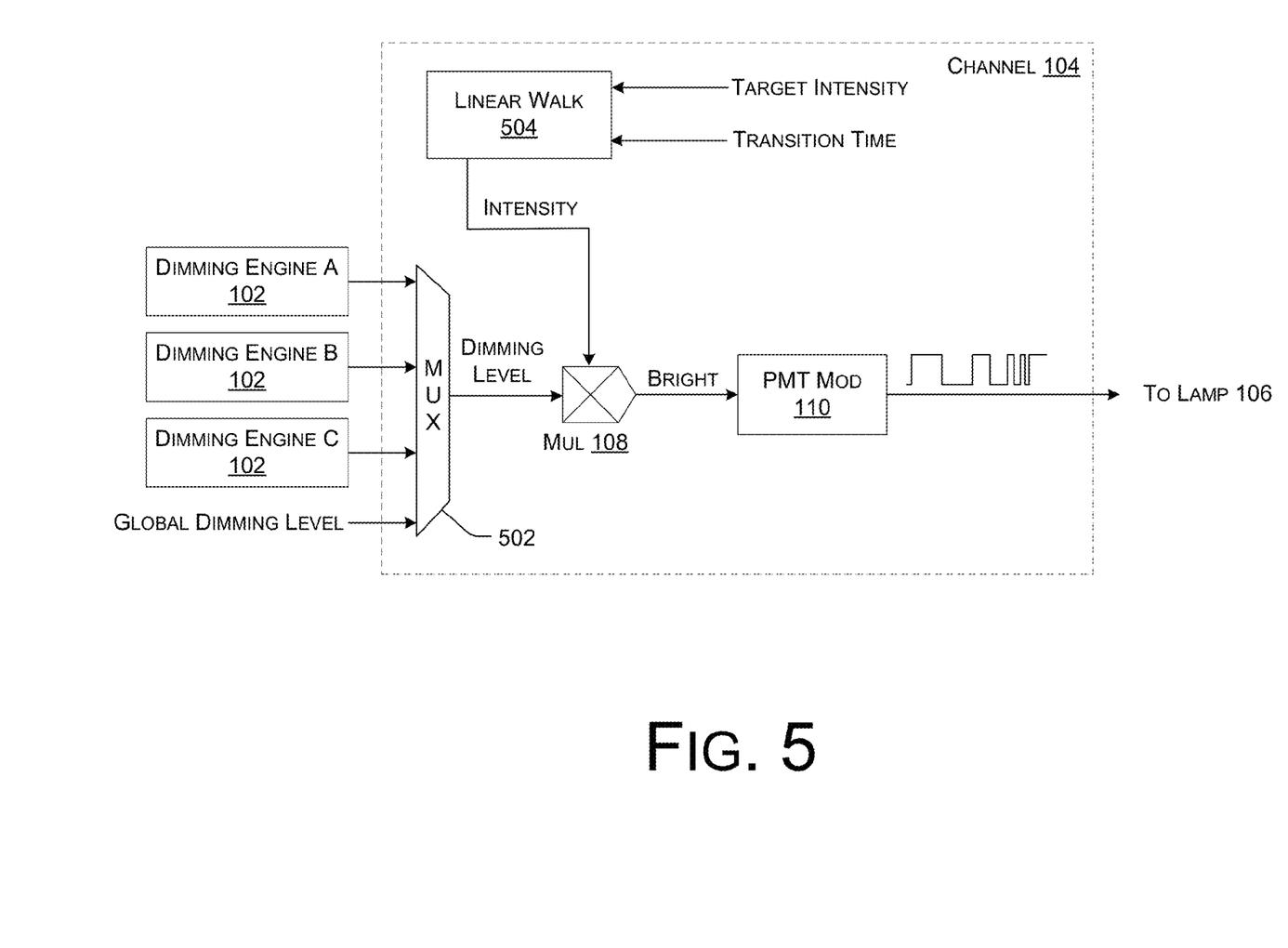
FIG. 5 is a block diagram showing example components of a channel, which may be employed as part of the BCCU of FIG. 4, for example, according to an implementation.

FIG. 5 is a block diagram showing example components of a channel 104, which may be employed as part of the BCCU 400 of FIG. 4, for example, according to an implementation. The example channel 104 may include some or all of the components discussed with respect to the example multi-channel brightness/color control arrangement 100. In alternate implementations, the channel 104 may include additional or alternate components.

As illustrated in FIG. 5, an example channel 104 may include multiple dimming engines 102 that may be multiplexed (at MUX 502) to form a single dimming level, for example. In an implementation, the MUX 502 may select the output of one dimming engine 102 as the input signal of the channel 104. In various implementations, the MUX 502 may alternate selection of the dimming engine 102 outputs, for example. Additionally, a global dimming level may also be multiplexed with individual dimming outputs from the dimming engines 102. The resulting dimming level output from the MUX 502 may be combined at a multiplier 108, for example, with a channel intensity value, as illustrated in FIG. 5. For example, the intensity value may be output from a linear walk arrangement 504, arranged to linearly transition changes in intensity.

As shown in FIG. 5, and discussed above, a modulator 110 receives the brightness value, and the output of the modulator 110 is a high frequency bit stream. In an implementation, a PMT modulator 110 is arranged to receive the brightness value, and output a modulated control signal (i.e., modulated bit stream) that is more easily used by the lamp 106, lamp driver 110 (not shown), or the like. For example, the PMT modulator 110 may convert the brightness value to a control signal with a varying rate of change.

In alternate implementations, such as the implementation of FIG. 5, various channel 104 configurations may be employed to provide brightness and/or color control to the lamp 106, or the like. In each of these channel 104 configurations, a PMT modulator 110 can be used to supply a modulated control signal (i.e., modulated bit stream), as described above.

In various implementations, additional or alternative components may be used to accomplish the disclosed techniques and arrangements.

Representative Process

Figure 6:
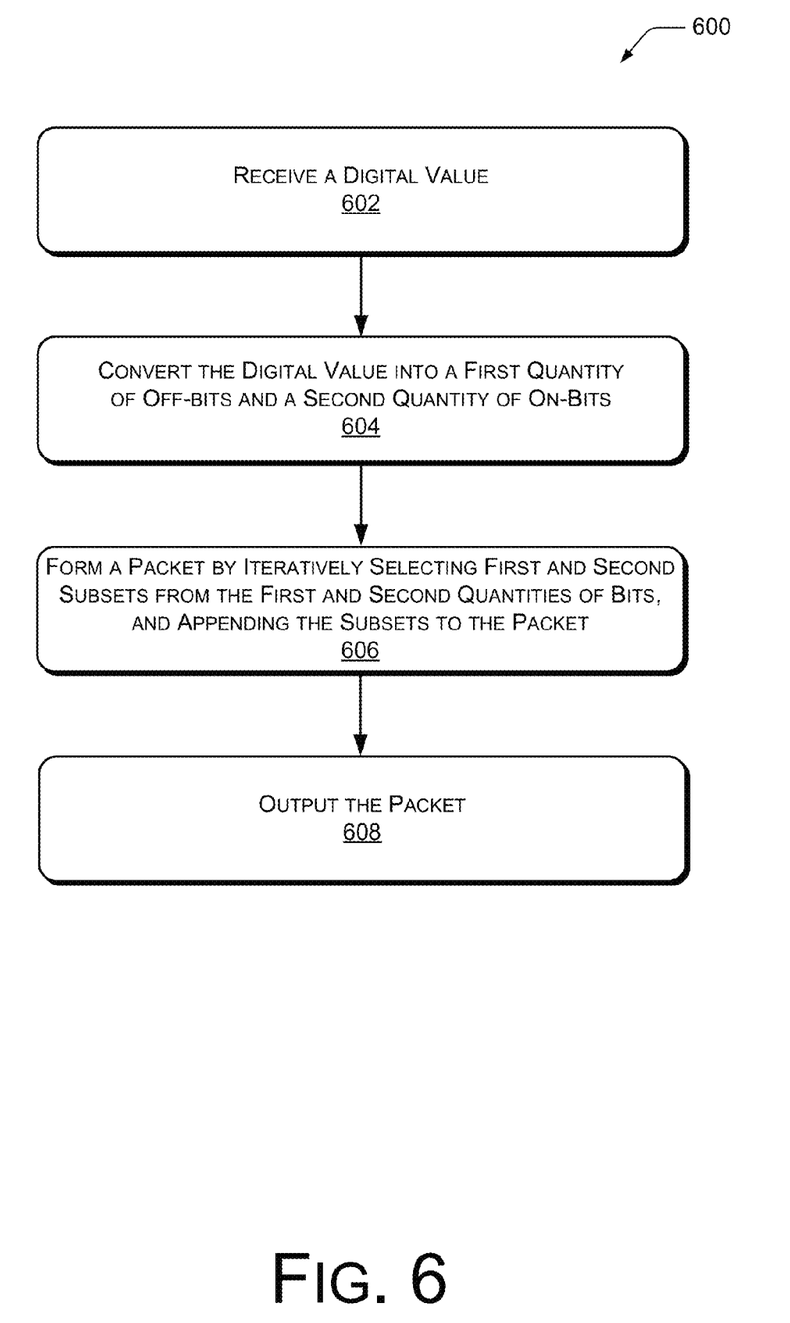
FIG. 6 is a flow diagram illustrating an example process for generating a packet which is the building block of an output bit stream.

FIG. 6 is a flow diagram illustrating an example process 600 for generating control signal information for a binary control signal, such as for a brightness component of a lamp (e.g., lamp 106), according to an implementation. The process 600 describes arranging a quantity of off-bits and a quantity of on-bits of the control signal. A packet (such as packet 202, for example) is formed by arranging alternating subsets of off-bits and on-bits, for example. In one example, the packets are output at a variable rate of change. The process 600 is described with reference to FIGS. 1-5.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 602, the process includes receiving a digital value (e.g., a brightness value). In an implementation, the digital value is received by a control signal generator (such as PMT modulator 110, for example).

At block 604, the process includes converting the digital value into a first quantity of off-bits (such as off-bit pool 204, for example) and a second quantity of on-bits (such as on-bit pool 206, for example). In other words, the process includes generating an on-bit pool containing a first quantity of on-bits and an off-bit pool containing a second quantity of off-bits, based on the digital value. In an implementation, at least one of the first quantity of off-bits and the second quantity of on-bits is based on an intensity value for a variably controlled load. For example, the second quantity of on-bits may be proportional to the intensity of the load, and the first quantity of off-bits may be inversely proportional to the intensity of the load.

At block 606, the process includes forming a packet by iteratively selecting a first subset of off-bits from the first quantity of off-bits and appending the first subset of off-bits to the packet and selecting a second subset of on-bits from the second quantity of on-bits and appending the second subset of on-bits to the packet.

In various implementations, the process includes forming a packet using alternative algorithms, or combinations of algorithms. In the implementations, the packet includes alternating subsets of consecutive off-bits and consecutive on-bits. In some examples, adjustable parameters of the algorithm(s) may be used to select a quantity of bits for the subsets. For example, in one implementation, the process includes selecting the first subset of off-bits and the second subset of on-bits such that at least one of the first subset and the second subset is comprised of a random quantity of bits.

In another implementation, the process includes selecting the first subset of off-bits and the second subset of on-bits such that at least one of the first subset and the second subset has a quantity of bits less than or equal to a predetermined maximum threshold quantity.

In an additional implementation, the process includes selecting the first subset of off-bits and/or the second subset of on-bits by dividing the first quantity of off-bits and/or the second quantity of on-bits by a divisor and selecting a subset of bits having a quantity of bits based on a quotient of the dividing. For example, in one implementation, the process includes selecting the first subset of off-bits such that the first subset has a quantity of bits approximately equal to half of the first quantity of off-bits and/or selecting the second subset of on-bits such that the second subset has a quantity of bits approximately equal to half of the second quantity of on-bits. In the implementation, the first and second quantities (e.g., pools) are reduced by half of their remaining quantity with each iteration.

In one implementation, the process includes appending any remaining off-bits and on-bits from the first quantity of off-bits and the second quantity of on-bits respectively to the packet when at least one of the first quantity of off-bits and the second quantity of on-bits is less than a preselected minimum threshold quantity of bits. In various implementations, the preselected minimum threshold quantity can be 0, 2, 3, 5, 10, or the like.

At block 608, the process includes outputting the packet. For example, the packet may be output to a driver to control a lamp (such as lamp 106, for example), or other variably controlled load.

In one implementation, the process includes outputting the packet via a binary signal (i.e., a modulated control signal, modulated bit stream) having a constantly varying rate of change.

In another implementation, the process includes outputting the packet via a spread spectrum output. For example, the spread spectrum output shapes the switching frequency of the output modulated control signal, improving EMC properties.

In alternate implementations, other techniques may be included in the process 800 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A hardware device, comprising:
    an off-bit pool and an on-bit pool arranged to receive a digital value, and to convert the digital value into a first quantity of off-bits and a second quantity of on-bits; and
    a packet generator arranged to generate a packet having alternating sets of consecutive off-bits and consecutive on-bits, the packet formed by iteratively selecting a subset of off-bits from the first quantity of off-bits and a subset of on-bits from the second quantity of on-bits and appending the subset of off-bits and the subset of on-bits to the packet, until at least one of the first quantity of off-bits and the second quantity of on-bits is less than a preselected minimum threshold quantity of bits.

2. The device of claim 1, wherein the packet generator is arranged to select the first subset of off-bits and the second subset of on-bits such that at least one of the first subset and the second subset has a random quantity of bits.

3. The device of claim 1, wherein the packet generator is arranged to select the first subset of off-bits and the second subset of on-bits such that at least one of the first subset and the second subset has a quantity of bits less than or equal to a predetermined maximum threshold quantity.

4. The device of claim 1, wherein the packet generator is arranged to select the first subset of off-bits such that the first subset has a quantity of bits approximately equal to half of the first quantity of off-bits and to select the second subset of on-bits such that the second subset has a quantity of bits approximately equal to half of the second quantity of on-bits.

5. The device of claim 1, wherein the packet generator is arranged to append any remaining off-bits and on-bits from the first quantity of off-bits and the second quantity of on-bits respectively to the packet when at least one of the first quantity of off-bits and the second quantity of on-bits has less than the preselected minimum threshold quantity of bits.

6. The device of claim 1, wherein the packet generator is arranged to output the packet via a bit stream having a variable rate of change.

7. The device of claim 1, wherein a mean value of the packet is proportional to the digital value.

8. A system implemented in hardware, comprising:
    a control signal generator arranged to receive a digital value and to generate a first pool of off-bits and a second pool of on-bits, and to generate a control signal based on selecting bits from the first pool of off-bits and the second pool of on-bits, the control signal comprised of a pseudo-random bit stream having a constantly varying rate of change.

9. The system of claim 8, wherein the control signal comprises one or more packets, each packet including alternating subsets of consecutive off-bits and consecutive on-bits, each packet formed by iteratively selecting a subset of off-bits from the first pool of off-bits and a subset of on-bits from the second pool of on-bits and appending the subset of off-bits and the subset of on-bits to the packet.

10. The system of claim 9, wherein the iterative selection of subsets of off-bits from the first pool of off-bits and subsets of on-bits from the second pool of on-bits is adjustable, and is based on a quantity of off-bits in the first pool of off-bits and/or a quantity of on-bits in the second pool of on-bits.

11. The system of claim 9, wherein the iterative selection of subsets of off-bits from the first pool of off-bits and subsets of on-bits from the second pool of on-bits is performed until at least one of the first pool of off-bits and the second pool of on-bits contains less than a preselected minimum threshold quantity of bits.

12. The system of claim 8, wherein the control signal is arranged to control an intensity of a variable load, a mean value of the control signal corresponding to an intensity of the variable load.

13. A method, comprising:
    receiving a digital value;
    converting the digital value into a first quantity of off-bits and a second quantity of on-bits;
    forming a packet by iteratively selecting a first subset of off-bits from the first quantity of off-bits and appending the first subset of off-bits to the packet and selecting a second subset of on-bits from the second quantity of on-bits and appending the second subset of on-bits to the packet; and
    outputting the packet.

14. The method of claim 13, further comprising selecting the first subset of off-bits and the second subset of on-bits such that at least one of the first subset and the second subset is comprised of a random quantity of bits.

15. The method of claim 13, further comprising selecting the first subset of off-bits and the second subset of on-bits such that at least one of the first subset and the second subset has a quantity of bits less than or equal to a predetermined maximum threshold quantity.

16. The method of claim 13, further comprising selecting the first subset of off-bits and/or the second subset of on-bits by dividing the first quantity of off-bits and/or the second quantity of on-bits by a divisor and selecting a subset of bits having a quantity of bits based on a quotient of the dividing.

17. The method of claim 13, further comprising selecting the first subset of off-bits such that the first subset has a quantity of bits approximately equal to half of the first quantity of off-bits and/or selecting the second subset of on-bits such that the second subset has a quantity of bits approximately equal to half of the second quantity of on-bits.

18. The method of claim 13, further comprising appending any remaining off-bits and on-bits from the first quantity of off-bits and the second quantity of on-bits respectively to the packet when at least one of the first quantity of off-bits and the second quantity of on-bits is less than a preselected minimum threshold quantity of bits.

19. The method of claim 13, further comprising outputting the packet via a binary signal having a constantly varying rate of change.

20. The method of claim 13, further comprising outputting the packet via a spread spectrum output.

21. The method of claim 13, wherein at least one of the first quantity of off-bits and the second quantity of on-bits is based on an intensity value for a variably controlled load.

22. The method of claim 13, wherein the preselected minimum threshold quantity of bits is equal to zero.

23. An apparatus, comprising:
one or more logic devices arranged to receive a digital control value, and to generate a binary control packet based on the digital control value, the binary control packet including alternating sets of consecutive off-bits and consecutive on-bits, the packet formed by iteratively selecting a subset of off-bits from a first quantity of off-bits and a subset of on-bits from a second quantity of on-bits, until at least one of the first quantity of off-bits and the second quantity of on-bits is less than a preselected minimum threshold quantity of bits, the first quantity of off-bits and the second quantity of on-bits organized from the digital control value.

24. The apparatus of claim 23, wherein the subset of off-bits and/or the subset of on-bits are selected based on an algorithm having adjustable parameters, the parameters of the algorithm adjustable based on changes to the binary control signal.

25. The apparatus of claim 23, wherein the apparatus is arranged to control at least one of a brightness and a color of a lamp via the binary control packet.

* * * * *